INVENTORS
Richard C. Bridgeman
Lauren L. Johnson

Their Attorney

United States Patent Office 3,209,234
Patented Sept. 28, 1965

3,209,234
SEMICONDUCTOR VOLTAGE REGULATOR
Richard C. Bridgeman, Clarendon Hills, and Lauren L. Johnson, Westchester, Ill., assignors to General Motors Corporation, Detroit, Mich., a corporation of Delaware
Filed June 25, 1962, Ser. No. 204,760
15 Claims. (Cl. 322—28)

This invention relates to voltage regulators and more particularly to voltage regulators of the type that are adapted to control the field current of a generator.

One of the objects of this invention is to provide a voltage regulator which has no vibrating contacts and which employs a plurality of semiconductors such as silicon controlled rectifiers.

Another object of this invention is to provide a voltage regulator which is capable of controlling the current flow through the field winding of the generator or the like and which includes a power stage, an oscillator and a detector.

A further object of this invention is to provide a voltage regulator wherein a power stage that includes a controlled rectifier controls the current flow through the field winding of a generator or the like and wherein the conduction of this controlled rectifier is controlled by an oscillator circuit and a detector circuit each including a controlled rectifier, the oscillator circuit providing a voltage output that is applied to the power stage controlled rectifier and to the detector controlled rectifier for turning off the controlled rectifiers of the power stage and detector under certain conditions of operation.

Still another object of this invention is to provide an electric circuit which is comprised of three controlled rectifiers, one of which forms a part of an oscillator circuit that applies voltages to the other two controlled rectifiers for turning off the other two controlled rectifiers simultaneously under certain conditions of operation.

Further objects and advantages of the present invention will be apparent from the following description, reference being had to the accompanying drawings wherein a preferred embodiment of the present invention is clearly shown.

In the drawings:

FIGURE 3 illustrates the voltage output wave form of the oscillator portion of the systems illustrated in FIGURES 1 and 2.

Figure 1:
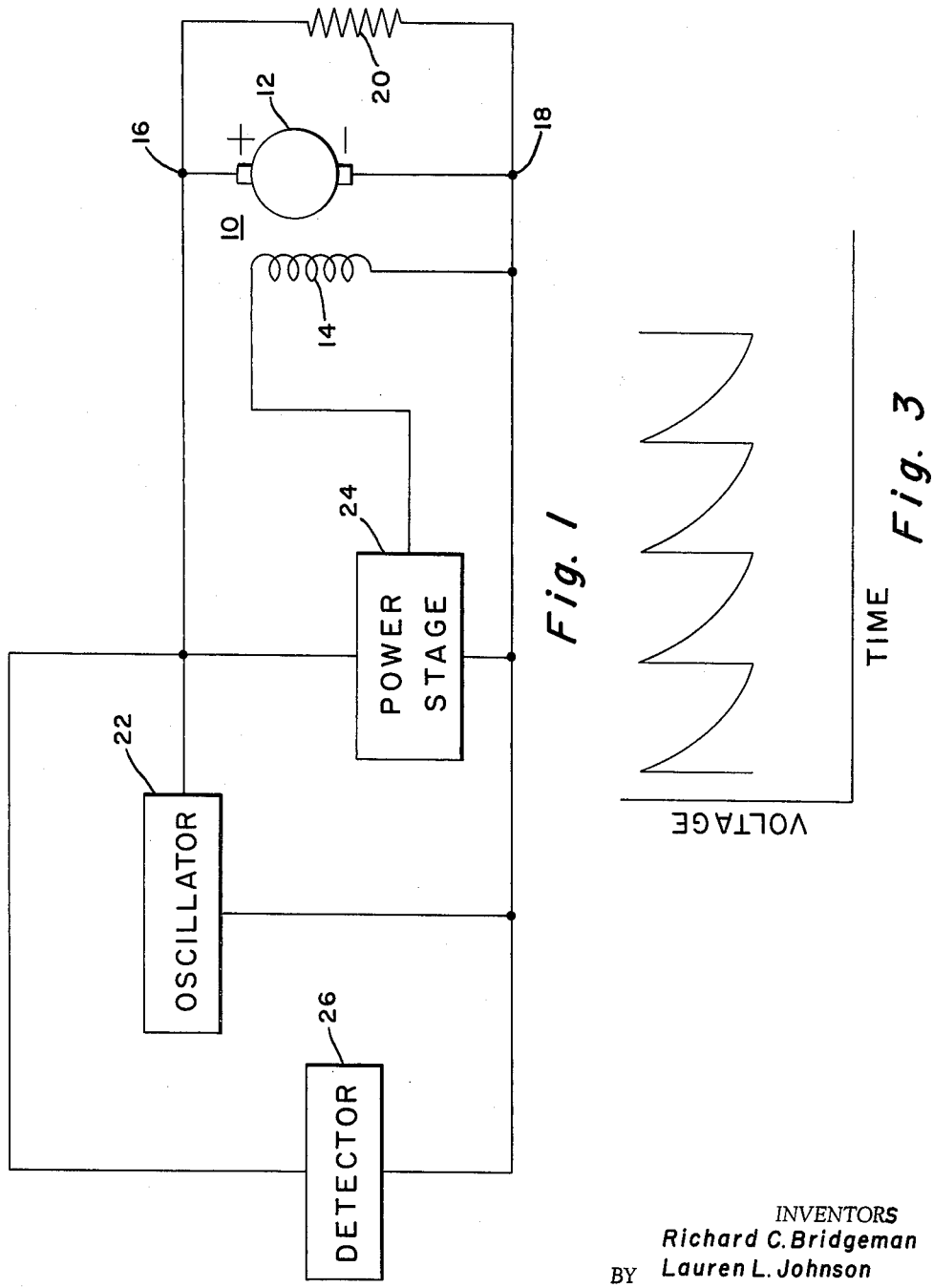
FIGURE 1 is a block diagram illustration of a voltage regulating system made in accordance with this invention.

Referring now to the drawings and more particularly to FIGURE 1, the reference numeral 10 designates a D.C. generator having an armature 12 and a shunt field winding 14. This generator may be of any well-known construction and may be used to supply any D.C. load. In the embodiment shown, the output terminals 16 and 18 of the generator supply a load 20 which is shown as a resistor.

The output voltage of the generator 10 is controlled by a semiconductor voltage regulator which is illustrated in block diagram form in FIGURE 1. This voltage regulator comprises an oscillator circuit 22, a power stage 24 and a detector or voltage sensing circuit 26. It is seen that the detector circuit and the oscillator circuit are both connected directly across the D.C. output terminals of the generator 10. The power stage 24 controls the current flow through the field winding 14 in accordance with the voltage sensed or detected by the detector 26. As will become more readily apparent hereinafter, the oscillator, power stage, and detector each include a controlled rectifier and the oscillator has an output voltage which can turn off the controlled rectifiers of the power stage and detector under predetermined conditions of operation.

Figure 2:
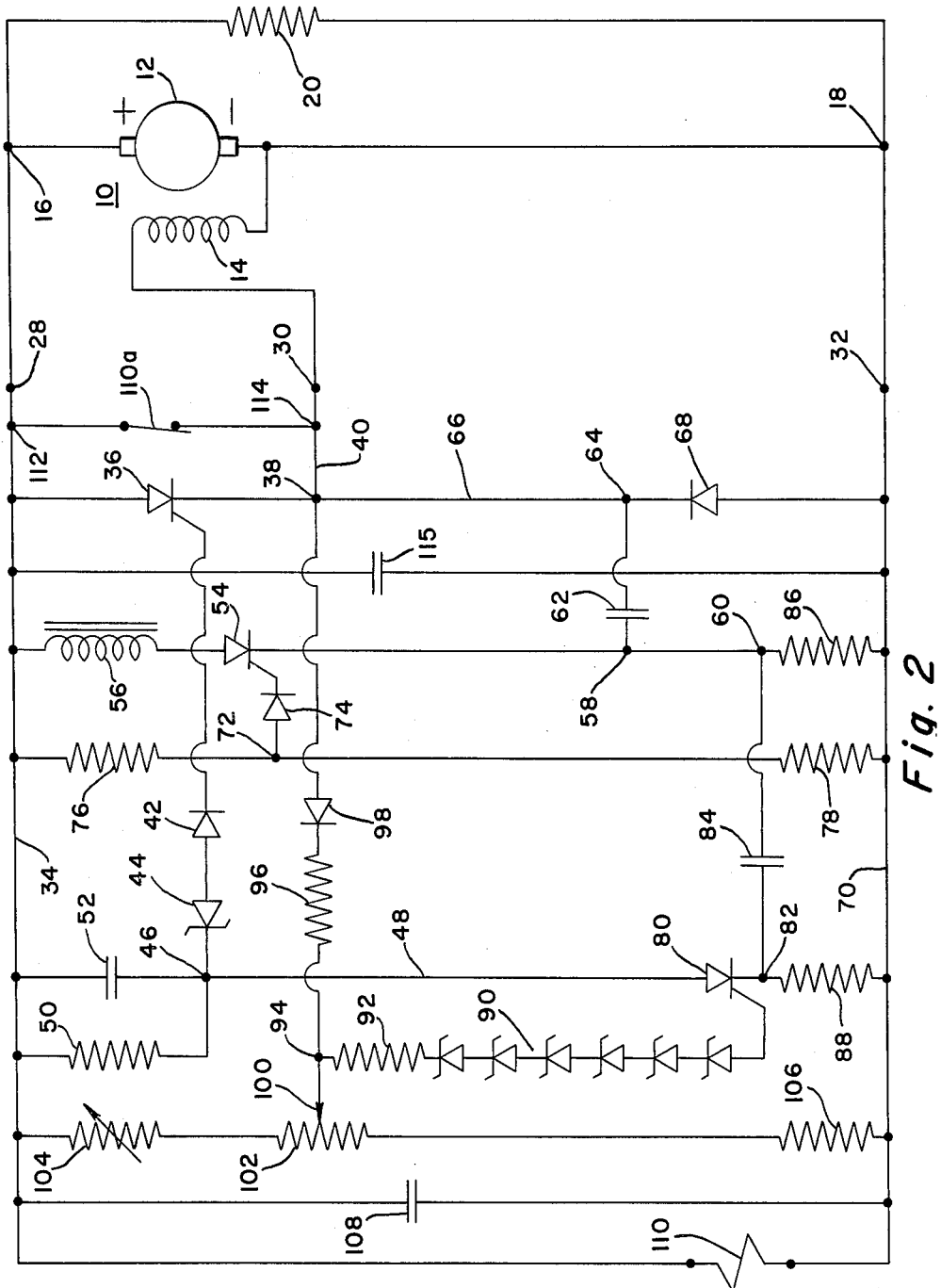
FIGURE 2 is a schematic circuit diagram of a voltage regulating system made in accordance with this invention.

Referring now more particularly to FIGURE 2, it is seen that the voltage regulator has a positive terminal 28, a field terminal 30, and a negative terminal 32. The field terminal 30 is connected to one side of the field winding 14 of the D.C. generator 10. The positive terminal 28 of the voltage regulator is connected with the positive output terminal 16 of the D.C. generator while the negative terminal 32 of the voltage regulator is connected with the negative terminal 18 of the D.C. generator.

The positive terminal 28 of the voltage regulator is connected with a conductor 34. This conductor is connected with the anode of a silicon controlled rectifier 36. The cathode of the controlled rectifier 36 is connected with junction 38 on conductor 40. It is seen that conductor 40 is connected with the field terminal 30 of the voltage regulator. The gate electrode of controlled rectifier 36 is connected to one side of a diode 42, the opposite side of this diode being connected to one side of a voltage responsive Zener diode 44. The opposite side of Zener diode 44 is connected with junction 46 on the lead wire 48. A resistor 50 connects the junction 46 with conductor 34. A capacitor 52 connects conductor 34 and the junction 46. The controlled rectifier 36 forms a part of the power stage 24 as will be more fully described hereinafter.

The voltage regulator has another silicon controlled rectifier 54 which forms a part of the oscillator 22. The anode of controlled rectifier 54 is connected with one side of an inductor 56, the opposite side of the inductor being connected with conductor 34. The cathode of controlled rectifier 54 is connected with junction 58 and this junction is connected with junction 60. A capacitor 62 connects the junction 58 with a junction 64 on conductor 66. A diode 68 connects the junction 64 and a conductor 70. The gate electrode of controlled rectifier 54 is connected with junction 72 via the diode 74. The junction 72 is connected between resistors 76 and 78 which form a voltage divider that is connected between conductors 34 and 70.

The voltage regulator has a third silicon controlled rectifier 80. The anode of controlled rectifier 80 is connected with junction 46 while the cathode of this controlled rectifier is connected with junction 82. The capacitor 84 connects the junction 82 with the junction 60. A resistor 86 connects junction 60 and the lead wire 70. Another resistor 88 is connected between junction 82 and the lead wire 70. The gate electrode of controlled rectifier 80 is connected in series with a plurality of Zener diodes 90. In the embodiment of FIGURE 2, there are six Zener diodes connected in series between the gate electrode of controlled rectifier 80 and the resistor 92.

The resistor 92 is connected with junction 94. The junction 94 is connected with a resistor 96. A diode 98 connects the resistor 96 with the junction 38. The junction 94 is connected with the shiftable tap 100 on a potentiometer resistor 102. The potentiometer resistor 102 forms part of a voltage dividing network which includes potentiometer resistor 104 and resistor 106. This voltage dividing network is connected directly across conductors 34 and 70 and is readily apparent from an inspection of FIGURE 2. A capacitor 108 is connected across conductors 34 and 70.

A relay coil 110 is connected across conductors 34 and 70 and this relay coil controls a relay contact 110a which is connected between junctions 112 and 114. When the relay coil 110 is de-energized, the contactor 110a is closed. When relay coil 110 is sufficiently energized, the contactor 110a is shifted to an open position.

The operation of the voltage regulator of this invention will now be described. As pointed out in describing FIGURE 1, the voltage regulator of this invention includes an oscillator circuit 22. This oscillator circuit includes the controlled rectifier 54, the diode 74, resistors 76 and 78, inductance 56, resistor 86 and capacitors 62 and 84. If it is assumed that the controlled rectifier 54 is initially turned off in its anode-cathode circuit, the cathode will have a potential which is negative and which is substantially equal to the potential of conductor 70. With the generator 10 having an output voltage, the controlled rectifier 54 will be turned on since the potential of junction 72 will be positive with respect to the potential of the cathode of controlled rectifier 54. The controlled rectifier 54 therefore turns on in its anode-cathode circuit and a circuit can now be traced between conductors 34 and 70 that is through inductor 56 and the anode-cathode circuit of controlled rectifier 54. When controlled rectifier 54 turns on, the potential of junction 58 approaches that of the conductor 34 and therefore is positive. The diode 74 at this time blocks any reverse gate current.

When controlled rectifier 54 is turned on in its anode-cathode circuit, the capacitors 62 and 84 will be charged from junction 58. The capacitor 84 will be charged through resistor 88 whereas the capacitor 62 will be charged through lead wire 66, junction 38, field winding 14 and then to the negative side of the generator. Because of the provision of the inductance 56, current continues to flow to charge these capacitors even after they have been charged to the potential of lead wire 34. The capacitors 62 and 84 will be charged to a potential which is higher than the potential of junction 34.

When the potential of junction 58 is higher than the potential of conductor 34, the controlled rectifier 54 is turned off. The capacitor 84 will now discharge through resistors 86 and 88 whereas the capacitor 62 will discharge through resistor 86 and the parallel circuits of the diode 68 and the field winding 14. When the capacitors 62 and 84 discharge, the potential of junction 58 will drop and at some point of time, the gate electrode of controlled rectifier 54 will therefore become positive with respect to its cahtode to once more turn on the controlled rectifier 54 and recharge the capacitors 62 and 84.

It can be seen from the foregoing that this oscillator circuit 22 causes the potential of junction 58 to increase and decrease and this is depicted in FIGURE 3 which illustrates the potential of junction 58 in a positive direction with respect to time. The oscillator frequency is controlled by the time constant of resistor 86 and capacitors 62 and 84 added in parallel. The period of this oscillation is approximately one millisecond. The magnitude of this oscillation is controlled by the voltage divider comprised of resistors 76 and 78 which establish the potential at junction 72. This potential also determines to some degree the period of oscillation. The capacitor 115 acts as a high frequency filter that increases the stability of the oscillator. This capacitor is necessary especially at low ambient temperatures because the capacitor 108 which preferably is an electrolytic capacitor drops in capacity.

The detector or voltage sensing circuit 26 includes the voltage divider 104, 102 and 106, the resistor 50, the Zener diode 44, the diode 42, the Zener diodes 90 and the controlled rectifier 80. The resistor 104 is a range control while resistor 102 is a voltage adjusting potentiometer. The tap 100 will sense a portion of the voltage appearing between conductors 34 and 70 and this tap may be adjusted to pick off a predetermined voltage which is to be maintained by the voltage regulator. By way of example and not by way of limitation, this voltage may be adjusted such that the tap 100 is at 60 volts where the desired regulated output voltage for the generator 10 is 74 volts.

The six Zener diodes 90 each have a 10 volt breakdown voltage so that when the tap 100 exceeds 60 volts the Zener diodes 90 will break down in a reverse direction. When these Zener diodes break down, the potential of the gate electrode of controlled rectifier 80 becomes positive with respect to its cathode and the controlled rectifier 80 therefore turns on in its anode-cathode circuit. Junction 46 which previously had a positive potential before controlled rectifier 80 turned on, now goes to a negative potential or towards the potential of conductor 70. It thus is seen that the potential of junction 46 is nearly the potential of lead wire 34 before the Zener diodes 90 break down and then shifts substantially to the potential of lead wire 70 when the regulated output voltage is exceeeded. The resistor 50 operates as a load for the controlled rectifier 80 while the capacitor 52 helps "stiffen" the voltage at junction 46 and helps turn off the controlled rectifier 80.

When the output voltage of the generator falls below the desired regulated value, the Zener diodes 90 cease to conduct. There therefore is no gate current for controlled rectifier 80 and this controlled rectifier can then be turned off by the oscillator. This oscillator as has been pointed out hereinbefore causes the potential of junction 58 to rise and fall and when the Zener diodes 90 are not conducting, and there is an opportunity for the oscillator to turn off the controlled rectifier 80 from the junction 58.

When controlled rectifier 80 turns off in its anode-cathode circuit, the capacitor 52 discharges through resistor 50 and the potential at junction 46 begins to rise ultimately to a potential substantially equal to that of conductor 34.

The power stage of the voltage regulator circuit includes the controlled rectifier 36 and the diode 68. It is seen that the anode-cathode circuit of controlled rectifier 36 will control the field current for field winding 14. This circuit can be traced from junction 16, through the anode-cathode circuit of controlled rectifier 36, through junction 38, through junction 30 and then through the field winding 14 to the negative side of the generator 10.

The gate electrode of controlled rectifier 36 is connected with junction 46 through Zener diode 44 and diode 42. It can be seen that the potential of junction 46 is at times substantially equal to the potential of lead wire 34 and therefore is positive. This potential is sufficient to break down the Zener diode 44 and therefore cause the gate electrode of controlled rectifier 36 to be positive with respect to its cathode. This causes the controlled rectifier 36 to conduct which completes a circuit for the field winding 14 across the output terminals of the generator and therefore provides substantially full field current.

When the voltage sensing circuit or detector causes the junction 46 to drop in potential as described hereinbefore, the gate electrode of controlled rectifier 36 goes sufficiently negative to stop gate current. There now is an opportunity for the oscillator to turn off the controlled rectifier 36 from junction 58 and this controlled rectifier is turned off for a short period of time. The Zener diode 44 is a 10 volt Zener diode. By the use of this Zener diode the junction 46 need not have the exact potential of lead wire 70 in order to stop gate current for controlled rectifier 36. The diode 42 blocks reverse gate current from the controlled rectifier 36.

When controlled rectifier 80 is turned off, the capacitor 52 discharges through resistor 50 and the potential at junction 46 will begin to rise and will ultimately reach the positive potential of lead wire 34. As soon as the potential at junction 46 is sufficiently high, it will turn on the controlled rectifier 36. The field current level will increase causing the output voltage of the generator to increase which in turn causes controlled rectifier 80 to turn on, decreasing the potential at 46 and therefore turning off controlled rectifier 36. This cycle occurs fast enough that the small rise and falls of the output voltage of the generator are negligible. The resistor 96 and diode 98 serve to close the inherent differential of the circuit.

The capacitor 108 filters the commutation ripple and gives a smoother operating regulator.

The field current which flows through the field winding 14 is an average value. When controlled rectifier 36 is on, the field current is continuous. When controlled rectifier 36 is turned off, the field is continuous and flows through diode 68 and will decay according to the field time constant. Since the relative on and off periods or magnitudes are shorter than the field time constant, the field current assumes a substantially continuous average value.

The relay 110 initially completes a circuit for the field winding 14 as the generator is building up due to residual magnetism. As soon as the generator builds up to a predetermined output voltage, the relay coil 110 causes the contractor 110a to open so that field current then is determined by the turning on and turning off of controlled rectifier 36.

Although the voltage regulator of this invention has been illustrated controlling a D.C. generator, it will be apparent to those skilled in the art that it can be used to control other power sources including an A.C. generator which would have its output voltage rectified by diodes.

While the embodiment of the present invention as herein disclosed constitutes a preferred form, it is to be understood that other forms might be adopted.

What is claimed is as follows:

1. In combination, a generator having a field winding, a D.C. output circuit energized from said generator, a first controlled rectifier having anode, cathode and gate electrodes, means connecting the anode-cathode circuit of said first controlled rectifier in series with said field winding and across said D.C. output circuit, an oscillator circuit energized from said D.C. output circuit, a voltage sensing circuit including a second controlled rectifier, means connecting said oscillator circuit with said first and second controlled rectifiers whereby said oscillator circuit provides turn off voltages for said first and second controlled rectifiers, and means connecting the anode of said second controlled rectifier with the gate electrode of said first controlled rectifier.

2. The combination according to claim 1 wherein the voltage sensing circuit includes the second controlled rectifier and at least one Zener diode.

3. The combination according to claim 1 wherein the anode of the second controlled rectifier is connected with the gate electrode of the first controlled rectifier through a circuit that includes a Zener diode and a diode.

4. A voltage regulator circuit comprising, a first controlled rectifier having anode, cathode and gate electrodes, a second controlled rectifier having anode, cathode and gate electrodes, a third controlled rectifier having anode, cathode and gate electrodes, a source of direct current power, a circuit connected across said source of direct current power including an inductor and the anode-cathode circuit of said second controlled rectifier, a voltage sensing circuit connected across said source of direct current power including said third controlled rectifier, first and second capacitors, means connecting said first capacitor between the cathode of said third controlled rectifier and the cathode of said second controlled rectifier, and means connecting said second capacitor between the cathodes of said first and second controlled rectifiers, said first controlled rectifier being adapted to control the current flow through a circuit element such as the field winding of the generator in accordance with the voltage appearing across the direct current circuit said capacitors and said second controlled rectifier forming a part of an oscillator circuit which has an output voltage that is operative to turn off said first and third controlled rectifiers when said first and third controlled rectifiers do not have a gate current.

5. In combination, a generator having a field winding, a direct current circuit energized from said generator, a controlled rectifier having anode, cathode and gate electrodes, a circuit for energizing said field winding connected across said direct current circuit and including the anode-cathode circuit of said controlled rectifier, an oscillator circuit energized from said direct current circuit for supplying a turn off voltage for said controlled rectifier, and a voltage sensing circuit connected with said direct current circuit and with the gate electrode of said controlled rectifier for varying the gate current of said controlled rectifier, said controlled rectifier being turned off in its anode-cathode circuit when said oscillator circuit has a predetermined output voltage and when said controlled rectifier does not have a biasing voltage applied thereto to provide a gate current.

6. The system according to claim 5 wherein the oscillator circuit includes a second controlled rectifier and at least one capacitor.

7. The system according to claim 5 wherein the oscillator circuit includes a second controlled rectifier and the voltage sensing circuit includes a third controlled rectifier.

8. In combination, a direct current generator having a field winding, an output circuit connected with the output terminals of said direct current generator, a first controlled rectifier having anode, cathode and gate electrodes, a second controlled rectifier having anode, cathode and gate electrodes, a third controlled rectifier having anode, cathode and gate electrodes, a first circuit connected across said output circuit including the anode-cathode circuit of said first controlled rectifier and said field winding, a second circuit connected across said output circuit including the anode-cathode circuit of said second controlled rectifier and an inductor, a third circuit connected across said output circuit including the anode-cathode circuit of said third controlled rectifier, a voltage divider network connected across said output circuit, a plurality of series-connected Zener diodes connected between said voltage divider network and the gate electrode of said third controlled rectifier, first and second capacitors, means connecting said first capacitor between the cathodes of said second and third controlled rectifiers, means connecting said second capacitor between the cathodes of said first and second controlled rectifiers, and a circuit connecting the anode of said third controlled rectifier with the gate electrode of said first controlled rectifier.

9. In combination, a source of direct current, a pair of conductors connected with said source of direct current, an electrical load, a controlled rectifier having anode, cathode and gate electrodes, means connecting the anode and cathode electrodes of said controlled rectifier and said electrical load in series across said conductors, a voltage sensing circuit connected across said conductors for sensing the direct current voltage appearing across said conductors, an oscillator circuit connected across said conductors and energized from said source of direct current, means connecting said oscillator circuit with the cathode of said controlled rectifier, said oscillator circuit continuously supplying turn-off signals to the cathode of said controlled rectifier when it is energized by said source of direct current, and means connecting said voltage sensing circuit with the gate and cathode electrodes of said controlled rectifier, said sensing circuit being capable of applying a forward bias separate from the output of said oscillator to the gate and cathode electrodes of said controlled rectifier when the voltage appearing across said conductors is below a predetermined value and removing said forward bias from said gate and cathode electrodes of said controlled rectifier when the voltage appearing across said conductors is above said predetermined value.

10. The combination according to claim 9 where the oscillator circuit includes a second controlled rectifier.

11. In combination, a generator having a field winding, a direct current circuit energized from said generator, a controlled rectifier having anode, cathode and gate electrodes, means connecting the anode-cathode circuit of said controlled rectifier in series with said field winding and across said direct current circuit, a voltage sensing circuit connected with said direct current circuit including a junction, the voltage of said junction varying in accordance with the voltage appearing across said direct current circuit, means connecting said junction with the gate electrode of said controlling rectifier, an oscillator circuit energized from said direct current circuit, said oscillator circuit including a second controlled rectifier and an inductor connected in series with said second controlled rectifier, and means connecting said oscillator circuit and the cathode of said controlled rectifier.

12. A voltage regulator comprising, first and second terminals adapted to be connected with a source of direct current, a third terminal adapted to be connected with an electrical load such as the field winding of a generator, a first controlled rectifier having anode, cathode and gate electrodes, means connecting the anode and cathode electrodes of said controlled rectifier between the first terminal and the third terminal of said regulator, an oscillator circuit including a second controlled rectifier having anode, cathode and gate electrodes, said oscillator circuit including a capacitor, means connecting the anode and cathode electrodes of said second controlled rectifier across said first and second terminals of said voltage regulator, means connecting said capacitor between the cathodes of said first and second controlled rectifiers, a voltage sensing circuit connected across said first and second terminals, said voltage sensing circuit being connected with the gate electrode of said first controlled rectifier and applying a forward bias to said first controlled rectifier when the voltage appearing across said first and second terminals is below a predetermined value, the forward bias on said first controlled rectifier being removed when the voltage appearing between said first and second terminals is above a predetermined value.

13. A voltage regulator comprising, first and second terminals adapted to be connected across a source of direct current, a third terminal adapted to be connected with an electrical load such as the field winding of a generator, a controlled rectifier having anode, cathode and gate electrodes, means connecting the anode and cathode electrodes of said controlled rectifier between the first terminal and the third terminal of said regulator, an oscillator circuit having an input connected with said first and second terminals and having an output connected with the cathode of said controlled rectifier, said oscillator circuit having a pulse output which is continuous and which is capable of turning off said controlled rectifier at a frequency of the pulses of the output of said oscillator, and a voltage sensing circuit connected with said first and second terminals, said voltage sensing circuit having an output separate from the output of said oscillator which is connected across the gate and cathode electrodes of said controlled rectifier, said controlled rectifier being periodically switched off by the pulse output of said oscillator and being switched on when the output of said voltage sensing circuit applies a forward bias to said controlled rectifier and during the interval between the output pulses of said oscillator.

14. A voltage regulator comprising, first and second terminals adapted to be connected across a source of direct current, a third terminal adapted to be connected with an electrical load, a controlled rectifier having anode, cathode and gate electrodes, means connecting the anode and cathode electrodes of said controlled rectifier between said first and third terminals of said regulator, oscillator means energized from said first and second terminals for continuously generating a series of voltage pulses, means for applying said series of voltage pulses to the cathode of said controlled rectifier whereby said controlled rectifier is periodically turned off at the frequency of said voltage pulses, means for deriving signal voltage which is separate from said series of voltage pulses and which is dependent upon the voltage appearing across said first and second terminals, and means for applying said signal voltage to the gate and cathode electrodes of said controlled rectifier, said signal voltage being capable of turning on said controlled rectifier at intervals between the pulses of said series of voltage pulses.

15. In combination, a generator having a field winding, a direct current circuit energized from said generator, a controlled rectifier having anode, cathode and gate electrodes, a circuit for energizing said field winding connected across said direct current circuit and including the anode-cathode circuit of said controlled rectifier, an oscillator circuit energized from said direct current circuit, said oscillator circuit having a voltage pulse output which is continuous when it is energized by said direct current circuit, means connecting the output of said oscillator circuit with the cathode of said controlled rectifier whereby said controlled rectifier is periodically switched off at the frequency of the output voltage pulses of said oscillator, and a voltage sensing circuit connected with said direct current circuit and with the gate electrode of said controlled rectifier for varying the gate current of said controlled rectifier, said controlled rectifier being periodically switched off by the pulse output of said oscillator and being switched on when the output of said voltage sensing circuit applies a forward bias to said controlled rectifier and during the interval between the output pulses of said oscillator.

References Cited by the Examiner
UNITED STATES PATENTS

| | | |
|---|---|---|
| 3,008,082 | 11/61 | Schlicher. |
| 3,010,062 | 11/61 | Van Emden. |
| 3,074,008 | 1/63 | McPhail et al. |

LLOYD McCOLLUM, *Primary Examiner.*